(12) United States Patent
Kimura et al.

(10) Patent No.: US 10,001,179 B2
(45) Date of Patent: Jun. 19, 2018

(54) CONTROL APPARATUS FOR POWER TRANSMISSION SYSTEM

(71) Applicant: TOYOTA JIDOSHA KABUSHIKI KAISHA, Toyota-shi, Aichi-ken (JP)

(72) Inventors: Motonori Kimura, Toyota (JP); Akihide Itoh, Nagoya (JP); Kazuya Sakamoto, Toyota (JP); Hiroki Kondo, Miyoshi (JP); Mitsuhiro Fukao, Toyota (JP); Kazuya Ishiizumi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days. days.

(21) Appl. No.: 15/179,061

(22) Filed: Jun. 10, 2016

(65) Prior Publication Data

US 2016/0369856 A1    Dec. 22, 2016

(30) Foreign Application Priority Data

Jun. 16, 2015   (JP) ................................. 2015-121578

(51) Int. Cl.
*F16D 48/06* (2006.01)
*F16D 48/02* (2006.01)
*B60W 30/18* (2012.01)

(52) U.S. Cl.
CPC ....... *F16D 48/066* (2013.01); *F16D 48/0206* (2013.01); *B60W 30/18018* (2013.01); *B60W 2710/023* (2013.01)

(58) Field of Classification Search
None
See application file for complete search history.

(56) References Cited

U.S. PATENT DOCUMENTS

| 8,758,197 B2 * | 6/2014 | Kamada ................ B60W 10/06 477/112 |
| 8,876,659 B2 * | 11/2014 | Kamioka .............. F04B 49/022 477/83 |
| 9,145,049 B2 * | 9/2015 | Colvin .................... F16D 48/08 |
| 2002/0091034 A1 | 7/2002 | Nakamori et al. |
| 2005/0178592 A1 | 8/2005 | Yamamoto et al. |

(Continued)

FOREIGN PATENT DOCUMENTS

| CN | 102328653 A | 1/2012 |
| DE | 10162973 A1 | 8/2002 |

(Continued)

*Primary Examiner* — Mark A Manley
(74) *Attorney, Agent, or Firm* — Oliff PLC

(57) ABSTRACT

A control apparatus for a power transmission system is provided. The control apparatus includes an electronic control unit. The electronic control unit is configured to, when a discharge flow rate of a mechanical oil pump is smaller than a predetermined flow rate and an electric oil pump is being driven while a vehicle is traveling, determine whether a decrease in the operating hydraulic pressure has occurred. The electronic control unit is configured to, when a first engagement device is controlled from a released state toward an engaged state, control a first control pressure such that the first control pressure in a case where a decrease in a operating hydraulic pressure has occurred is lower than the first control pressure in a case where a decrease in the operating hydraulic pressure does not occur.

1 Claim, 5 Drawing Sheets

(56) References Cited

U.S. PATENT DOCUMENTS

| | | |
|---|---|---|
| 2006/0120876 A1* | 6/2006 | Kitano ................... B60K 6/48 |
| | | 417/42 |
| 2007/0060441 A1 | 3/2007 | Kim et al. |
| 2008/0296124 A1 | 12/2008 | Schiele et al. |
| 2008/0308355 A1 | 12/2008 | Kakinami et al. |
| 2010/0216597 A1 | 8/2010 | Grundler et al. |
| 2011/0319227 A1 | 12/2011 | Kamada et al. |
| 2012/0135840 A1 | 5/2012 | Tatewaki et al. |
| 2012/0234645 A1 | 9/2012 | Shimizu et al. |
| 2013/0078111 A1 | 3/2013 | Okamoto |
| 2013/0081491 A1* | 4/2013 | Arai ....................... F16D 48/08 |
| | | 74/331 |
| 2016/0185343 A1 | 6/2016 | Inoue et al. |
| 2017/0307065 A1 | 10/2017 | Buchmann et al. |

FOREIGN PATENT DOCUMENTS

| | | |
|---|---|---|
| DE | 102006039259 A1 | 3/2007 |
| DE | 102005059356 A1 | 6/2007 |
| DE | 602005005096 T2 | 6/2008 |
| DE | 102008001130 A1 | 12/2008 |
| DE | 102008041402 A1 | 2/2010 |
| DE | 102009001110 A1 | 8/2010 |
| DE | 102011008362 A1 | 7/2012 |
| DE | 102012216834 A1 | 3/2013 |
| DE | 112012000330 T5 | 10/2013 |
| DE | 112014003644 T5 | 4/2016 |
| DE | 102015201107 A1 | 7/2016 |
| EP | 2309154 A1 | 4/2011 |
| JP | 2012-030779 A | 2/2012 |
| JP | 2012-112461 A | 6/2012 |
| JP | 5337300 B2 | 11/2013 |

* cited by examiner

CONTROL APPARATUS FOR POWER TRANSMISSION SYSTEM

INCORPORATION BY REFERENCE

The disclosure of Japanese Patent Application No. 2015-121578 filed on Jun. 16, 2015 including the specification, drawings and abstract is incorporated herein by reference in its entirety.

BACKGROUND OF THE INVENTION

1. Field of the Invention

The invention relates to a control apparatus for a power transmission system including a mechanical oil pump, an electric oil pump and an engagement device that is controlled to be engaged or released by using a hydraulic pressure that is discharged from the mechanical oil pump or the electric oil pump as a source.

2. Description of Related Art

There is well known a power transmission system including a mechanical oil pump, an electric oil pump and an engagement device that is controlled to be engaged or released by using a control pressure of which a source pressure is an operating hydraulic pressure based on a hydraulic pressure that is discharged from the mechanical oil pump or the electric oil pump. This is, for example, a vehicle described in Japanese Patent Application Publication No. 2012-112461 (JP 2012-112461 A). JP 2012-112461 A describes the vehicle as follows. The vehicle includes a mechanical oil pump and an electric oil pump. The mechanical oil pump is driven by the power of an engine. The electric oil pump is driven by electric power that is supplied from a battery. The electric oil pump is driven in order to secure a control pressure that is supplied to an engagement device during a stop of the engine.

SUMMARY OF THE INVENTION

Incidentally, when the entire control pressure that is supplied to the engagement device is intended to be secured with the use of the electric oil pump, the electric power consumption and body size of the electric oil pump increase. Therefore, it is desired to reduce the discharge flow rate of the electric oil pump. In this respect, as the discharge flow rate of the electric oil pump is reduced, there can be a case where a required control pressure is not secured at the time when the engagement device is engaged by using a hydraulic pressure from the electric oil pump, so control for engaging the engagement device may not be appropriately executed. If the required control pressure is not secured during engagement of the engagement device, there is a concern that the progress of engaging process stagnates or the engaging process regresses toward a released state and then the engagement device is suddenly engaged at the time when the required control pressure is secured. If this occurs during traveling, shock may occur.

The invention provides a control apparatus for a power transmission system, which is able to prevent or reduce shock at the time when an engagement device is engaged while a hydraulic pressure that is the source of a control pressure for the engagement device is being generated by an electric oil pump during vehicle traveling.

An aspect of the invention provides a control apparatus for a power transmission system. The power transmission system is mounted on a vehicle. The power transmission system includes a mechanical oil pump, an electric oil pump, and a first engagement device. Each of the mechanical oil pump and the electric oil pump is configured to discharge oil such that an operating hydraulic pressure of the power transmission system is generated. The first engagement device is configured to be controlled to be engaged or released by using a first control pressure of which a source pressure is the operating hydraulic pressure. The control apparatus includes an electronic control unit. The electronic control unit is configured to, when a discharge flow rate of the mechanical oil pump is smaller than a predetermined flow rate and the electric oil pump is being driven while the vehicle is traveling, determine whether a decrease in the operating hydraulic pressure has occurred. The electronic control unit is configured to, when the first engagement device is controlled from a released state toward an engaged state, control the first control pressure such that the first control pressure in a case where a decrease in the operating hydraulic pressure has occurred is lower than the first control pressure in a case where a decrease in the operating hydraulic pressure does not occur.

With the control apparatus according to this aspect, when a decrease in the operating hydraulic pressure that is the source pressure of the first control pressure that is supplied to the first engagement device is determined, the supply of hydraulic pressure to the first engagement device is reduced (restricted) by decreasing the first control pressure, and the first control pressure that is required at the time of controlling the first engagement device from the released state toward the engaged state is decreased. Therefore, it is possible to secure the required first control pressure even when the discharge flow rate of the electric oil pump is not increased. Thus, sudden engagement resulting from the fact that the first control pressure that is required during engagement of the first engagement device is secured in a state where the required first control pressure is not secured is avoided or reduced. Therefore, when the entire hydraulic pressure that is the source of the control pressure of the engagement device is being generated by the electric oil pump during vehicle traveling, it is possible to prevent or reduce shock at the time when the engagement device is engaged.

In the control apparatus according to the above aspect, the power transmission system may include a second engagement device and a plurality of power transmission paths. The second engagement device may be configured to be controlled to be engaged or released by using a second control pressure of which a source pressure is the operating hydraulic pressure. The plurality of power transmission paths may be arranged in parallel with each other between an input rotating member and an output rotating member. Power of a driving force source of the vehicle may be transmitted to the input rotating member. The output rotating member may output the power to a drive wheel of the vehicle. The plurality of power transmission paths may include a first power transmission path and a second power transmission path. The first power transmission path may be established when the first engagement device is engaged. The second power transmission path may be established when the second engagement device is engaged. The electronic control unit may be configured to, when controlling the first engagement device from the released state toward the engaged state and controlling the second engagement device from an engaged state toward a released state are executed at the same time, control the first engagement device and the second engagement device such that a total of transmission torque that increases as a result of engaging the first engagement device and transmission torque that reduces as a result of releasing the second engagement device is constant.

With the control apparatus according to this aspect, in control for changing the engaged clutch such that the second engagement device is released and the first engagement device is engaged, a total of transmission torque that is transmitted by the first engagement device and transmission torque that is transmitted by the second engagement device is kept constant, so it is possible to prevent or reduce shock.

In the control apparatus according to the above aspect, the second engagement device may include a piston and a friction member, the piston may move in a direction to engage the second engagement device or a direction to release the second engagement device by using the second control pressure, and the friction member may be pressed by the piston. The electronic control unit may be configured to, when a decrease in the operating hydraulic pressure has occurred and the second control pressure is lower than or equal to a piston stroke end pressure at the time when the second engagement device is controlled from the engaged state toward the released state, stop supplying the second control pressure instead of decreasing the first control pressure. The piston stroke end pressure may be a pressure value of the second control pressure, which is required from the second engagement device to keep the piston at a position at which transmission of torque is started.

With the control apparatus according to this aspect, the supply of hydraulic pressure to the second engagement device is set to zero at the time when the second control pressure is lower than or equal to the piston stroke end pressure in process of releasing the second engagement device. Therefore, it is possible to secure the first control pressure that is required to engage the first engagement device while preventing the second engagement device from being suddenly released.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described in detail with reference to the accompanying drawings.

Figure 1:
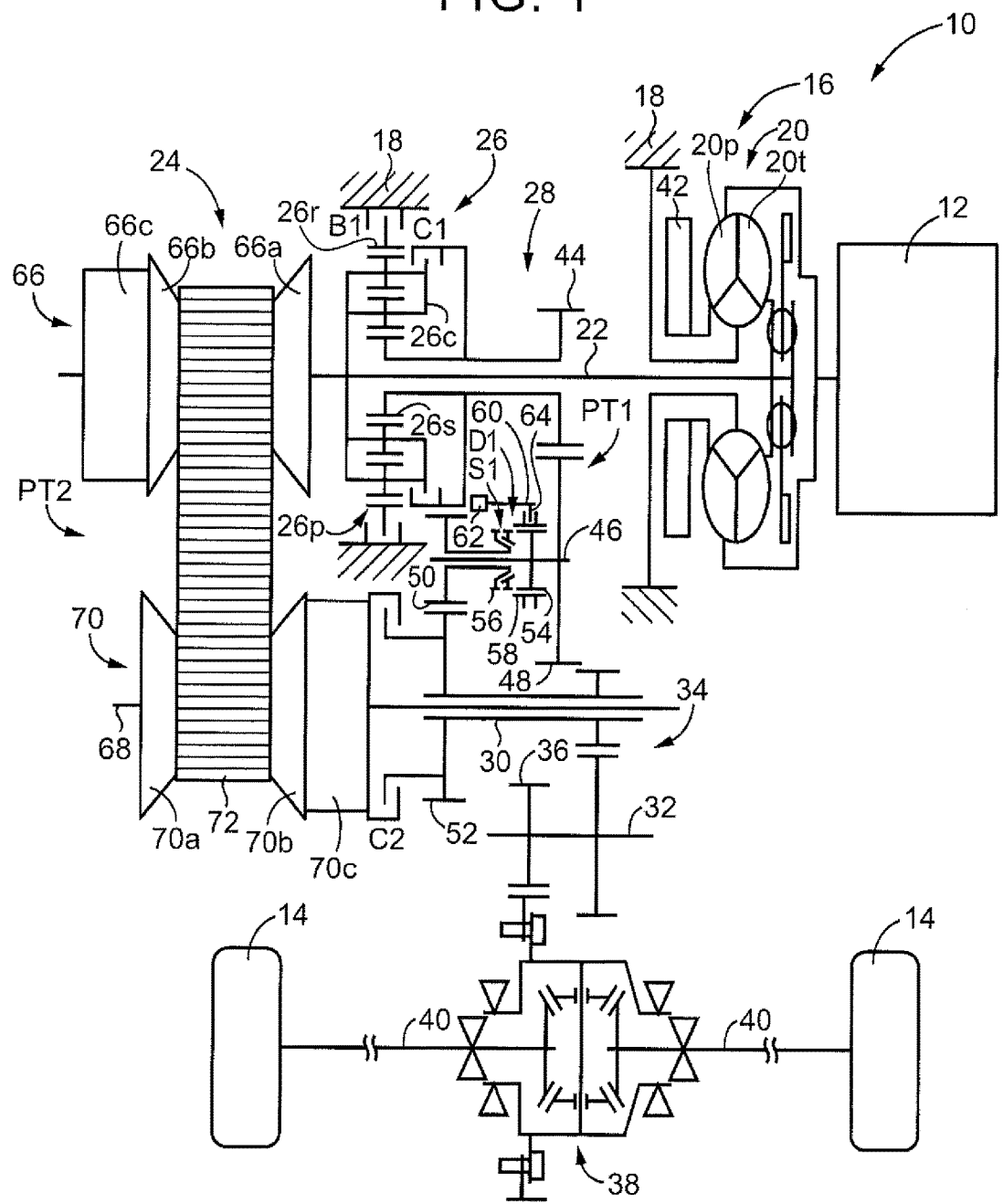
FIG. 1 is a view that illustrates the schematic configuration of a vehicle to which the invention is applied.

FIG. 1 is a view that illustrates the schematic configuration of a vehicle 10 to which the invention is applied. As shown in FIG. 1, the vehicle 10 includes an engine 12, drive wheels 14 and a power transmission system 16. The engine 12 functions as a driving force source for propelling the vehicle 10. The engine 12 is, for example, a gasoline engine or a diesel engine. The power transmission system 16 is provided between the engine 12 and the drive wheels 14. The power transmission system 16 includes a known torque converter 20, an input shaft 22, a known belt-type continuously variable transmission 24, a forward/reverse switching device 26, a gear transmission mechanism 28, an output shaft 30, a counter shaft 32, a reduction gear unit 34, a differential gear 38, a pair of axles 40, and the like, in a housing 18 that serves as a non-rotating member. The torque converter 20 serves as a fluid transmission device coupled to the engine 12. The input shaft 22 is coupled to the torque converter 20. The continuously variable transmission 24 is coupled to the input shaft 22. The continuously variable transmission 24 serves as a continuously variable transmission unit. The forward/reverse switching device 26 is also coupled to the input shaft 22. The gear transmission mechanism 28 serves as a gear transmission unit. The gear transmission mechanism 28 is coupled to the input shaft 22 via the forward/reverse switching device 26. The gear transmission mechanism 28 is provided in parallel with the continuously variable transmission 24. The output shaft 30 is an output rotating member common to the continuously variable transmission 24 and the gear transmission mechanism 28. The reduction gear unit 34 is formed of a pair of gears. The pair of gears are respectively provided on the output shaft 30 and the counter shaft 32 so as to be relatively non-rotatable, and are in mesh with each other. The differential gear 38 is coupled to a gear 36. The gear 36 is provided on the counter shaft 32 so as to be relatively non-rotatable. The pair of axles 40 are coupled to the differential gear 38. In the thus configured power transmission system 16, the power of the engine 12 (when not specifically distinguished from one another, power is synonymous with torque and force) is transmitted to the pair of drive wheels 14 via the torque converter 20, the continuously variable transmission 24 (or the forward/reverse switching device 26, the gear transmission mechanism 28), the reduction gear unit 34, the differential gear 38, the axles 40, and the like, sequentially.

In this way, the power transmission system 16 includes the gear transmission mechanism 28 and the continuously variable transmission 24. The gear transmission mechanism 28 serves as a first transmission unit. The continuously variable transmission 24 serves as a second transmission unit. The gear transmission mechanism 28 and the continuously variable transmission 24 are provided in parallel with each other in power transmission paths between the engine 12 (which is synonymous with the input shaft 22 that is an input rotating member to which the power of the engine 12 is transmitted) and the drive wheels 14 (which are synonymous with the output shaft 30 that is an output rotating member from which the power of the engine 12 is output to the drive wheels 14). Thus, the power transmission system 16 includes the plurality of power transmission paths PT in parallel with each other between the input shaft 22 and the output shaft 30. The plurality of power transmission paths PT include a first power transmission path PT1 and a second power transmission path PT2. The first power transmission path PT1 transmits the power of the engine 12 from the input shaft 22 to the drive wheels 14 side (that is, the output shaft 30) via the gear transmission mechanism 28. The second power transmission path PT2 transmits the power of the engine 12 from the input shaft 22 to the drive wheels 14 side (that is, the output shaft 30) via the continuously variable transmission 24. The power transmission system 16 changes the power transmission path between the first power transmission path PT1 and the second power transmission path PT2 on the basis of a traveling state of the vehicle 10. Therefore, the power transmission system 16 includes a plurality of engagement devices that selectively change the power transmission path PT, which transmits the power of the engine 12 to the drive wheels 14 side, between the first power transmission path PT1 and the second power transmission path PT2. The engagement devices include a first clutch C1, a first brake B1 and a second clutch C2. The first clutch C1 and the first brake B1 each function as a first engagement device that connects or interrupts the first power transmission path PT1 (in other words, a first engagement device that establishes the first power transmission path PT1 when engaged). The second clutch C2 serves as a second engagement device that connects or interrupts the second power transmission path PT2 (in other words, a second engagement device that establishes the second power transmission path PT2 when engaged). The first clutch C1, the first brake B1 and the second clutch C2 each correspond to a separating device. Each of the first clutch C1, the first brake B1 and the second clutch C2 is a known hydraulic friction engagement device (friction clutch) that is frictionally engaged by a hydraulic actuator. Each of the first clutch C1 and the first brake B1 is one of elements that constitute the forward/reverse switching device 26, as will be described later.

The torque converter 20 is provided around the input shaft 22 coaxially with the input shaft 22. The torque converter 20 includes a pump impeller 20$p$ and a turbine runner 20$t$. The pump impeller 20$p$ is coupled to the engine 12. The turbine runner 20$t$ is coupled to the input shaft 22. The power transmission system 16 includes a mechanical pump 42. The mechanical pump 42 serves as a mechanical oil pump, and is coupled to the pump impeller 20$p$. When the mechanical pump 42 is driven by the engine 12 to rotate, the mechanical pump 42 generates (discharges) hydraulic pressure for executing control for shifting the continuously variable transmission 24, actuating the plurality of engagement devices and supplying lubricating oil to the portions of the power transmission system 16.

The forward/reverse switching device 26 is provided around the input shaft 22 coaxially with the input shaft 22 in the first power transmission path PT1. The forward/reverse switching device 26 includes a double-pinion-type planetary gear set 26$p$, the first clutch C1 and the first brake B1. The planetary gear set 26$p$ is a differential mechanism including three rotating elements, that is, a carrier 26$c$, a sun gear 26$s$ and a ring gear 26$r$. The carrier 26$c$ serves as an input element. The sun gear 26$s$ serves as an output element. The ring gear 26$r$ serves as a reaction element. The carrier 26$c$ is integrally coupled to the input shaft 22. The ring gear 26$r$ is selectively coupled to the housing 18 via the first brake B1. The sun gear 26$s$ is coupled to a small-diameter gear 44. The small-diameter gear 44 is provided around the input shaft 22 coaxially with the input shaft 22 so as to be relatively rotatable. The carrier 26$c$ and the sun gear 26$s$ are selectively coupled to each other via the first clutch C1. Thus, the first clutch C1 is the engagement device that selectively couples two of the three rotating elements to each other. The first brake B1 is the engagement device that selectively couples the reaction element to the housing 18.

The gear transmission mechanism 28 includes the small-diameter gear 44 and a large-diameter gear 48. The large-diameter gear 48 is provided around a gear mechanism counter shaft 46 coaxially with the gear mechanism counter shaft 46 so as to be relatively non-rotatable. The large-diameter gear 48 is in mesh with the small-diameter gear 44. The gear transmission mechanism 28 includes an idler gear 50 and an output gear 52. The idler gear 50 is provided around the gear mechanism counter shaft 46 coaxially with the gear mechanism counter shaft 46 so as to be relatively rotatable. The output gear 52 is provided around the output shaft 30 coaxially with the output shaft 30 so as to be relatively non-rotatable. The output gear 52 is in mesh with the idler gear 50. The output gear 52 has a larger diameter than the idler gear 50. Therefore, the gear transmission mechanism 28 is the gear transmission mechanism having a speed ratio (speed position) as a predetermined speed ratio (speed position) in the power transmission path PT between the input shaft 22 and the output shaft 30. The gear transmission mechanism 28 further includes a dog clutch D1. The dog clutch D1 is provided around the gear mechanism counter shaft 46 between the large-diameter gear 48 and the idler gear 50. The dog clutch D1 selectively connects the large-diameter gear 48 to the idler gear 50 or disconnects the large-diameter gear 48 from the idler gear 50. The dog clutch D1 functions as a third engagement device that connects or interrupts the first power transmission path PT1 (in other words, the third engagement device that establishes the first power transmission path PT1 when engaged together with the first engagement device). The dog clutch D1 is arranged in the power transmission path between the forward/reverse switching device 26 (which is synonymous with the first engagement device) and the output shaft 30 (in other words, provided on the output shaft 30 side with respect to the first engagement device). The dog clutch D1 is included in the plurality of engagement devices.

Specifically, the dog clutch D1 includes a clutch hub 54, a clutch gear 56 and a cylindrical sleeve 58. The clutch hub 54 is provided around the gear mechanism counter shaft 46 coaxially with the gear mechanism counter shaft 46 so as to be relatively non-rotatable. The clutch gear 56 is arranged between the idler gear 50 and the clutch hub 54, and is fixed to the idler gear 50. The sleeve 58 is spline-fitted to the clutch hub 54. Thus, the sleeve 58 is provided so as to be relatively non-rotatable around the axis of the gear mechanism counter shaft 46 and relatively movable in a direction parallel to the axis. When the sleeve 58 that is constantly rotated integrally with the clutch hub 54 is moved toward the clutch gear 56 and is meshed with the clutch gear 56, the idler gear 50 and the gear mechanism counter shaft 46 are connected to each other. The dog clutch D1 includes a known synchromesh mechanism S1 that serves as a synchronization mechanism. The synchromesh mechanism S1 synchronizes rotations at the time of fitting the sleeve 58 to the clutch gear 56. In the thus configured dog clutch D1, when the fork shaft 60 is actuated by a hydraulic actuator 62, the sleeve 58 is caused to slide in the direction parallel to the axis of the gear mechanism counter shaft 46 via the shift fork 64 fixed to the fork shaft 60, and the engaged state and the released state are changed.

The first power transmission path PT1 is established when the dog clutch D1 and the first clutch C1 (or the first brake B1) provided on the input shaft 22 side with respect to the dog clutch D1 both are engaged. When the first clutch C1 is engaged, a forward power transmission path is established. When the first brake B1 is engaged, a reverse power transmission path is established. When the first power transmission path PT1 is established, the power transmission system 16 is set to a power transmittable state where the power of the engine 12 is allowed to be transmitted from the input shaft 22 to the output shaft 30 via the gear transmission mechanism 28. On the other hand, when at least both the first clutch C1 and the first brake B1 are released or at least the dog clutch D1 is released, the first power transmission path PT1 is set to a neutral state (power transmission interrupted state) where transmission of power is interrupted.

The continuously variable transmission 24 includes a primary pulley 66, a secondary pulley 70 and a transmission belt 72. The primary pulley 66 is provided on the input shaft 22, and has a variable effective diameter. The secondary pulley 70 is provided on a rotary shaft 68 coaxial with the output shaft 30, and has a variable effective diameter. The transmission belt 72 is wound around the pulleys 66, 70 so as to span between the pulleys 66, 70. Power is transmitted via a friction force (belt clamping force) between the pair of pulleys 66, 70 and the transmission belt 72. In the primary pulley 66, a hydraulic pressure that is supplied to the primary pulley 66 (that is, a primary pressure Pin that is supplied to a primary hydraulic cylinder 66c) is regulated by a hydraulic control circuit 80 (see FIG. 3 and FIG. 4) that is driven by an electronic control unit 90 (see FIG. 3 and FIG. 4), with the result that a primary thrust Win (=Primary pressure Pin×Pressure receiving area) that changes the V-groove width between sheaves 66a, 66b is applied. In the secondary pulley 70, when a hydraulic pressure that is supplied to the secondary pulley 70 (that is, a secondary pressure Pout that is supplied to a secondary hydraulic cylinder 70c) is regulated by the hydraulic control circuit 80, with the result that a secondary thrust Wout (=Secondary pressure Pout×Pressure receiving area) that changes the V-groove width between sheaves 70a, 70b is applied. In the continuously variable transmission 24, when each of the primary thrust Win (primary pressure Pin) and the secondary thrust Wout (secondary pressure Pout) is controlled, the winding diameter (effective diameter) of the transmission belt 72 is changed as a result of a change in the V-groove width of each of the pulleys 66, 70. Thus, a speed ratio γcvt (=Primary pulley rotation speed Npri/Secondary pulley rotation speed Nsec) is changed, and a friction force between each of the pulleys 66, 70 and the transmission belt 72 is controlled such that the transmission belt 72 does not slip.

The output shaft 30 is arranged around the rotary shaft 68 so as to be relatively rotatable coaxially with the rotary shaft 68. The second clutch C2 is provided on the drive wheels 14 side (which is synonymous with the output shaft 30 side) with respect to the continuously variable transmission 24 (that is, the second clutch C2 is provided between the secondary pulley 70 and the output shaft 30). The second clutch C2 selectively connects the secondary pulley 70 (rotary shaft 68) to the output shaft 30 or disconnects the secondary pulley 70 (rotary shaft 68) from the output shaft 30. The second power transmission path PT2 is established when the second clutch C2 is engaged. When the second power transmission path PT2 is established, the power transmission system 16 is set to a power transmittable state where the power of the engine 12 is allowed to be transmitted from the input shaft 22 to the output shaft 30 via the continuously variable transmission 24. On the other hand, the second power transmission path PT2 is set to a neutral state when the second clutch C2 is released.

Figure 2:
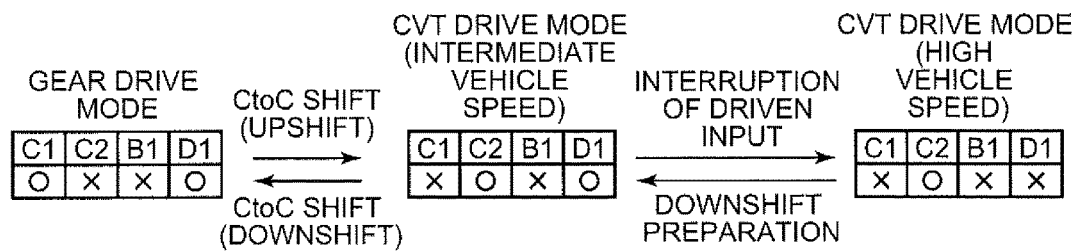
FIG. 2 is a chart for illustrating changes in driving pattern of a power transmission system.

The operation of the power transmission system 16 will be described below. FIG. 2 is a view for illustrating changes in driving pattern (drive mode) of the power transmission system 16 by using an engagement chart of the engagement devices for each driving pattern that is changed by the electronic control unit 90. In FIG. 2, C1 corresponds to the operation state of the first clutch C1, C2 corresponds to the operation state of the second clutch C2, B1 corresponds to the operation state of the first brake B1, D1 corresponds to the operation state of the dog clutch D1, "O" indicates an engaged (connected) state, and "x" indicates a released (disconnected) state.

In FIG. 2, in gear drive mode that is the driving pattern in which the power of the engine 12 is transmitted to the output shaft 30 via the gear transmission mechanism 28 (that is, via the first power transmission path PT1), the first clutch C1 and the dog clutch D1 are engaged, and the second clutch C2 and the first brake B1 are released. In the driving pattern of the gear drive mode, forward traveling is enabled. In the driving pattern of the gear drive mode, in which the first brake B1 and the dog clutch D1 are engaged and the second clutch C2 and the first clutch C1 are released, reverse traveling is enabled.

In CVT drive mode (belt drive mode, continuously variable shift drive mode) that is the driving pattern in which the power of the engine 12 is transmitted to the output shaft 30 via the continuously variable transmission 24 (that is, via the second power transmission path PT2), the second clutch C2 is engaged, and the first clutch C1 and the first brake B1 are released. In the driving pattern of the CVT drive mode, forward traveling is enabled. Within the CVT drive mode, the dog clutch D1 is engaged in the driving pattern of the CVT drive mode (intermediate vehicle speed), whereas the dog clutch D1 is released in the driving pattern of the CVT drive mode (high vehicle speed). The reason why the dog clutch D1 is released in the CVT drive mode (high vehicle speed) is to, for example, eliminate a drag of the gear transmission mechanism 28, and the like, in the CVT drive mode and prevent high-speed rotation of the gear transmission mechanism 28, the constituent members (for example, pinion gears) of the planetary gear set 26p, and the like, at a high vehicle speed. The dog clutch D1 functions as a driven input interrupting clutch that interrupts an input from the drive wheels 14 side.

The gear drive mode is, for example, selected in a low vehicle speed region including a state during a stop of the vehicle. In the power transmission system 16, a speed ratio γgear that is established by the first power transmission path PT1 (that is, a speed ratio EL that is established by the gear transmission mechanism 28) is set to a value larger than (that is, a speed ratio lower than) the maximum speed ratio that is established by the second power transmission path PT2 (that is, the lowest speed ratio that is the lowest vehicle speed-side speed ratio that is established by the continuously variable transmission 24) γmax. That is, the continuously variable transmission 24 establishes a higher vehicle speed-side (higher-side) speed ratio γcvt than the speed ratio EL that is established by the gear transmission mechanism 28. For example, the speed ratio EL corresponds to a first-speed speed ratio γ1 that is the speed ratio γ of the first speed position in the power transmission system 16, and the lowest speed ratio γmax of the continuously variable transmission 24 corresponds to a second-speed speed ratio γ2 that is the speed ratio γ of the second speed position in the power transmission system 16. Therefore, for example, the gear drive mode and the CVT drive mode are changed in accordance with a shift line for changing the speed position between the first speed position and the second speed position in a shift map of a known stepped transmission. In the CVT drive mode, a shift to change the speed ratio γcvt is carried out on the basis of a traveling state, such as an accelerator operation amount θacc and a vehicle speed V, by using, for example, a known technique.

In changing the driving pattern from the gear drive mode to the CVT drive mode (high vehicle speed) or changing the driving pattern from the CVT drive mode (high vehicle speed) to the gear drive mode, the change is carried out via the CVT drive mode (intermediate vehicle speed) as shown in FIG. 2. For example, when the driving pattern is changed from the gear drive mode to the CVT drive mode (high vehicle speed), the driving pattern is changed to the CVT drive mode (intermediate vehicle speed) by carrying out a shift for changing the engaged clutch (for example, clutch-to-clutch shift (hereinafter, referred to as CtoC shift)) so as to release the first clutch C1 and engage the second clutch C2. After that, the dog clutch D1 is released. For example, when the driving pattern is changed from the CVT drive mode (high vehicle speed) to the gear drive mode, the driving pattern is changed to the CVT drive mode (intermediate vehicle speed) by engaging the dog clutch D1 in preparation for changing the driving pattern to the gear drive mode. After that, a shift for changing the engaged clutch (for example, CtoC shift) is carried out so as to release the second clutch C2 and engage the first clutch C1.

Figure 3:
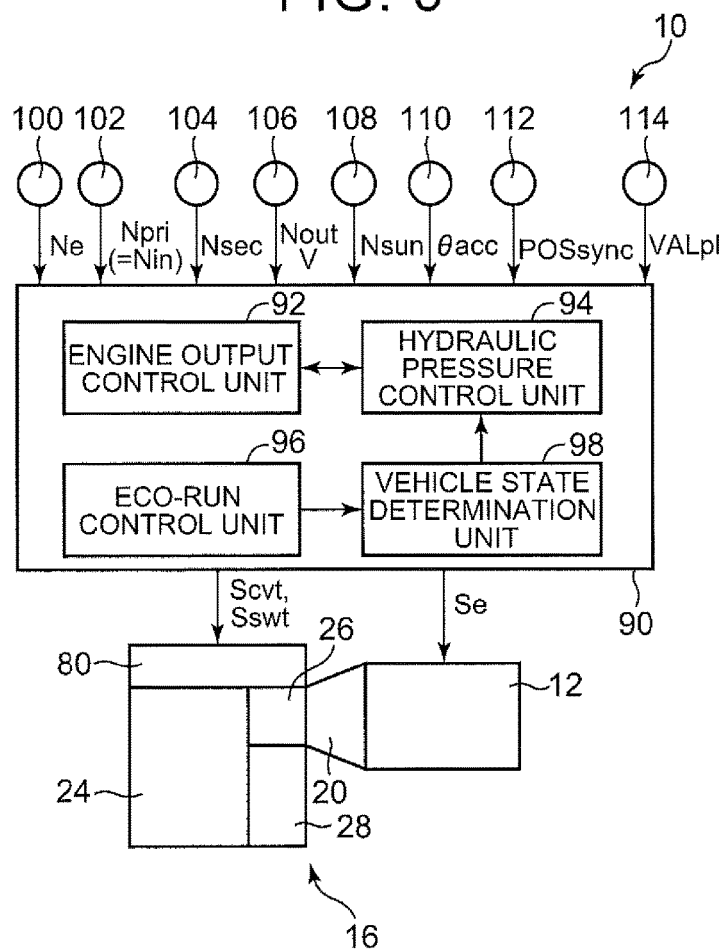
FIG. 3 is a view that illustrates a relevant portion of control functions and control system for various controls in the vehicle.

FIG. 3 is a view that illustrates a relevant portion of control functions and control system for various controls in the vehicle 10. As shown in FIG. 3, the vehicle 10 includes, for example, an electronic control unit 90 including a control apparatus for the power transmission system 16. Thus, FIG. 3 is a view that shows input/output lines of the electronic control unit 90, and is a functional block diagram that illustrates a relevant portion of control functions implemented by the electronic control unit 90. The electronic control unit 90 includes a so-called microcomputer. The microcomputer includes, for example, a CPU, a RAM, a ROM, input/output interfaces, and the like. The CPU executes various controls over the vehicle 10 by executing signal processing in accordance with programs prestored in the ROM while utilizing a temporary storage function of the RAM. For example, the electronic control unit 90 is configured to execute output control over the engine 12, control for shifting the continuously variable transmission 24, control for changing the driving pattern of the power transmission system 16, and the like. Where necessary, the electronic control unit 90 is split into an electronic control unit for controlling the engine, an electronic control unit for controlling hydraulic pressure, and the like.

Various actual values based on detection signals of various sensors of the vehicle 10 are supplied to the electronic control unit 90. The various sensors include, for example, various rotation speed sensors 100, 102, 104, 106, 108, an accelerator operation amount sensor 110, a stroke sensor 112, a hydraulic pressure sensor 114, and the like. The various actual values include, for example, an engine rotation speed Ne, a primary pulley rotation speed Npri that is an input shaft rotation speed Nin, a secondary pulley rotation speed Nsec that is a rotation speed of the rotary shaft 68, an output shaft rotation speed Nout corresponding to a vehicle speed V, a sun gear rotation speed Nsun that is a rotation speed of the small-diameter gear 44, an accelerator operation amount θacc, a synchromesh position POSsync, a line pressure value VALpl that is the value of a line pressure PL, and the like. The synchromesh position POSsync is a movement position of the shift fork 64 (or the fork shaft 60, or the like), and corresponds to information about the position of the sleeve 58 between a releasing-side position of the sleeve 58 and an engaging-side position of the sleeve 58. At the releasing-side position of the sleeve 58, the dog clutch D1 is placed in a completely released state. At the engaging-side position of the sleeve 58, the dog clutch D1 is placed in a completely engaged state. An engine output control command signal Se, a hydraulic control command signal Scvt, a hydraulic control command signal Sswt, and the like, are output from the electronic control unit 90. The engine output control command signal Se is used to control the output of the engine 12. The hydraulic control command signal Scvt is used to control hydraulic pressures associated with a shift of the continuously variable transmission 24. The hydraulic control command signal Sswt is used to control the first clutch C1, the first brake B1, the second clutch C2 and the dog clutch D1 associated with a change of the driving pattern of the power transmission system 16. For example, command signals (hydraulic pressure commands) for respectively driving solenoid valves that control hydraulic pressures that are supplied to hydraulic actuators of the first clutch C1, the first brake B1, the second clutch C2 and the dog clutch D1 are output to the hydraulic control circuit 80 as the hydraulic control command signal Sswt.

Figure 4:
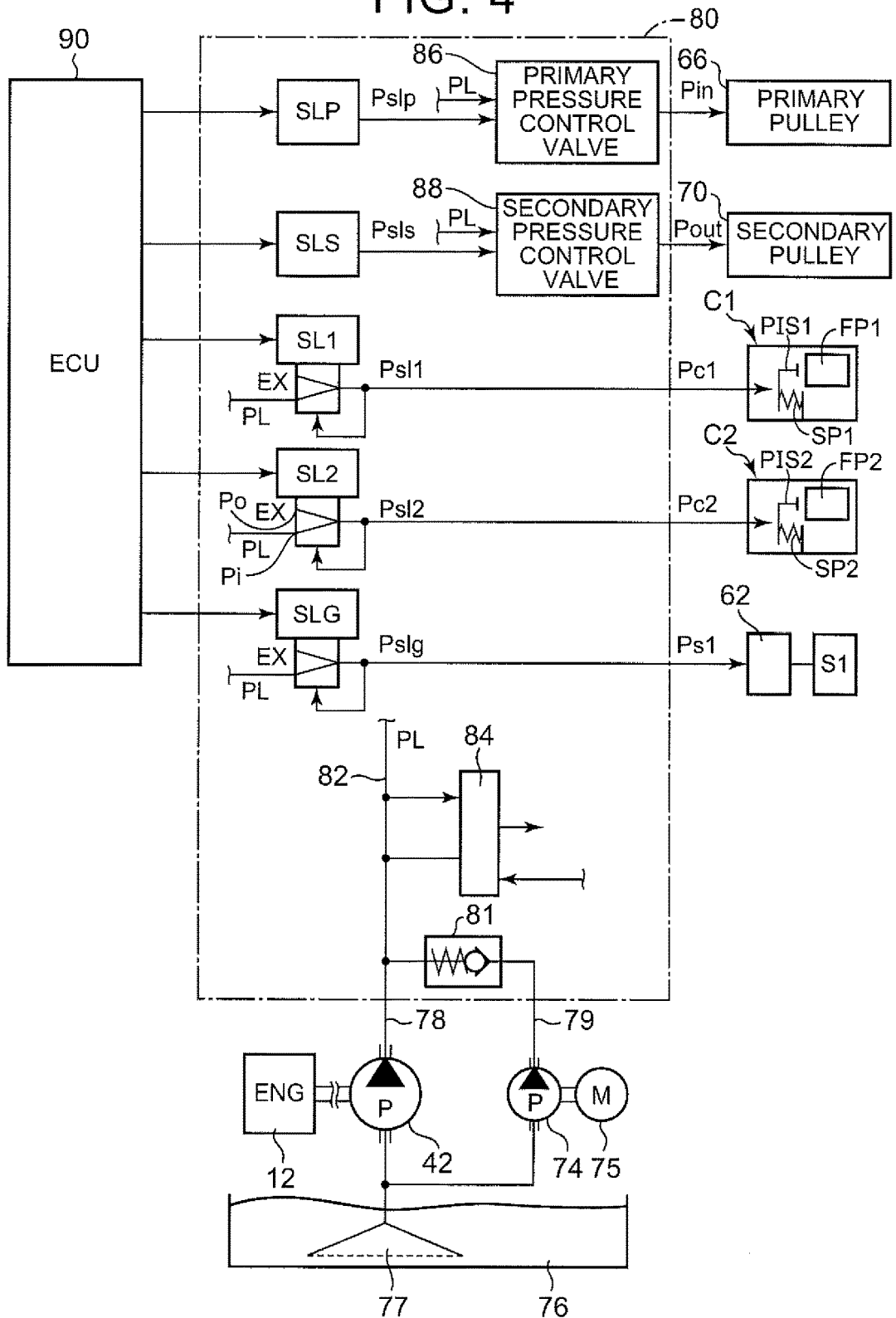
FIG. 4 is a view that illustrates a part of a hydraulic control circuit, which controls hydraulic pressures associated with a continuously variable transmission, a first clutch, a second clutch and a dog clutch.

FIG. 4 is a view that illustrates a part of the hydraulic control circuit 80 provided in the power transmission system 16, which controls hydraulic pressures associated with the continuously variable transmission 24, the first clutch C1, the second clutch C2 and the dog clutch D1. FIG. 4 is also a view that illustrates hydraulic pressures that are supplied to the hydraulic control circuit 80. In FIG. 4, the power transmission system 16 includes not only the mechanical pump 42 but also an electric oil pump 74 that serves as an electric oil pump.

The electric oil pump 74 is arranged in parallel with the mechanical pump 42. When the electric oil pump 74 is driven by an electric motor 75 to rotate, the electric oil pump 74 is able to discharge hydraulic pressure for actuating the plurality of engagement devices and supplying lubricating oil to the portions of the power transmission system 16 as well as the mechanical pump 42 irrespective of a rotation state of the engine 12 (for example, during a rotation stop of the engine 12). The mechanical pump 42 is not able to discharge hydraulic oil, for example, when the engine 12 is automatically stopped under automatic stop-restart control (eco-run control) of the engine 12 (described later). For this reason, the electric oil pump 74 is operated, for example, during an engine automatic stop under eco-run control that is executed while the vehicle 10 is decelerating or stopped. In this way, the electric oil pump 74 is exclusively temporarily used as an alternative to the mechanical pump 42. Therefore, for example, the rated maximum discharge flow rate is set to a discharge flow rate smaller than the discharge flow rate of the mechanical pump 42, and the size of the electric oil pump 74 is compact.

Each of the mechanical pump 42 and the electric oil pump 74 draws hydraulic oil, returned to an oil pan 76, through a common inlet (strainer) 77, and discharges the hydraulic oil to a corresponding one of discharge oil passages 78, 79. The oil pan 76 is provided at the lower portion of the housing 18. The discharge oil passage 78 is directly coupled to an oil passage (for example, a line pressure oil passage 82 through which the line pressure PL flows) within the hydraulic control circuit 80. The discharge oil passage 79 is coupled to the oil passage via a check valve 81 provided in the hydraulic control circuit 80. The check valve 81 is provided between the discharge oil passage 78 and the discharge oil passage 79. The check valve 81 prevents hydraulic pressure output from the mechanical pump 42 from flowing into the discharge oil passage 79 side.

The hydraulic control circuit 80 includes a regulator valve 84, a primary electromagnetic valve SLP, a secondary electromagnetic valve SLS, a C1 electromagnetic valve SL1, a C2 electromagnetic valve SL2, a synchromesh electromagnetic valve SLG, a primary pressure control valve 86 and a secondary pressure control valve 88. The regulator valve 84 regulates the line pressure PL that is an operating hydraulic pressure based on a hydraulic pressure that is output from at least one of the mechanical pump 42 and the electric oil pump 74. The primary electromagnetic valve SLP controls the primary pressure Pin that is supplied to the primary pulley 66. The secondary electromagnetic valve SLS controls the secondary pressure Pout that is supplied to the secondary pulley 70. The C1 electromagnetic valve SL1 controls a C1 pressure Pc1 that is supplied to the first clutch C1. The C2 electromagnetic valve SL2 controls a C2 pressure Pc2 that is supplied to the second clutch C2. The synchromesh electromagnetic valve SLG controls a synchromesh control pressure Ps1 that is supplied to the hydraulic actuator 62 for actuating the synchromesh mechanism S1.

Each of the electromagnetic valves SLP, SLS, SL1, SL2, SLG is a linear solenoid valve that is driven by a hydraulic control command signal (driving current) that is output from the electronic control unit 90. The primary pressure control valve 86 is actuated on the basis of an SLP pressure Pslp that is output from the primary electromagnetic valve SLP. Thus, the primary pressure control valve 86 regulates the primary pressure Pin by using the line pressure PL as a source pressure. The secondary pressure control valve 88 is actuated on the basis of an SLS pressure Psls that is output from the secondary electromagnetic valve SLS. Thus, the secondary pressure control valve 88 regulates the secondary pressure Pout by using the line pressure PL as a source pressure. The C1 electromagnetic valve SL1 outputs an SL1 pressure Psl1 by using the line pressure PL as a source pressure. The SL1 pressure Psl1 is directly supplied to the first clutch C1 as the C1 pressure Pc1. The C2 electromagnetic valve SL2 outputs an SL2 pressure Psl2 by using the line pressure PL as a source pressure. The SL2 pressure Psl2 is directly supplied to the second clutch C2 as the C2 pressure Pc2. The synchromesh electromagnetic valve SLG outputs an SLG pressure Pslg by using the line pressure PL as a source pressure. The SLG pressure Pslg is directly supplied to the hydraulic actuator 62 as the synchromesh control pressure Ps1. Therefore, the first clutch C1 is controlled to be engaged or released by using the SL1 pressure Psl1 (C1 pressure Pc1) that is a first control pressure of which a source pressure is the line pressure PL. The second clutch C2 is controlled to be engaged or released by using the SL2 pressure Psl2 (C2 pressure Pc2) that is a second control pressure of which a source pressure is the line pressure PL. The dog clutch D1 is controlled to be engaged or released by using the SLG pressure Pslg (synchromesh control pressure Ps1) that is a third control pressure of which a source pressure is the line pressure PL.

The first clutch C1 includes a piston PIS1, a friction member FP1, a return spring SP1, and the like. The piston PIS1 moves in a direction to engage the first clutch C1 or a direction to release the first clutch C1 by using the C1 pressure Pc1. The friction member FP1 is pressed by the piston PIS1. The friction member FP1 includes a plurality of separate plates and friction plates each interposed between the adjacent separate plates. The return spring SP1 urges the piston PIS1 in the direction to release the first clutch C1. The second clutch C2 includes a piston PIS2, a friction member FP2, a return spring SP2, and the like. The piston PIS2 moves in a direction to engage the second clutch C2 or a direction to release the second clutch C2 by using the C2 pressure Pc2. The friction member FP2 is pressed by the piston PIS2. The friction member FP2 includes a plurality of separate plates and friction plates each interposed between the adjacent separate plates. The return spring SP2 urges the piston PIS2 in the direction to release the second clutch C2. In the thus configured first clutch C1, when the control pressure Pc1 is supplied to the first clutch C1, the piston PIS1 is moved toward the friction member FP1 to press the friction member FP1, and the first clutch C1 is controlled from the released state toward the engaged state. In the thus configured second clutch C2, when the control pressure Pc2 is supplied to the second clutch C2, the piston PIS2 is moved toward the friction member FP2 to press the friction member FP2, and the second clutch C2 is controlled from the released state toward the engaged state.

Referring back to FIG. 3, the electronic control unit 90 includes engine output control means, that is, an engine output control unit 92, hydraulic pressure control means, that is, a hydraulic pressure control unit 94, and eco-run control means, that is, an eco-run control unit 96.

The engine output control unit 92, for example, calculates a required driving force Fdem on the basis of the accelerator operation amount θacc and the vehicle speed V from a relationship (for example, driving force map) obtained experimentally or by design and stored in advance (that is, determined in advance). The engine output control unit 92 sets a target engine torque Tetgt by which the required driving force Fdem is obtained. The engine output control unit 92 outputs, to a throttle actuator, a fuel injection device, an ignition device, and the like, the engine output control command signal Se for output control over the engine 12 such that the target engine torque Tetgt is obtained.

During a stop of the vehicle, the hydraulic pressure control unit 94 outputs, to the hydraulic control circuit 80, a command to operate the hydraulic actuator 62 to engage the dog clutch D1 in preparation for the gear drive mode. After that, at the time when the shift lever is shifted into the forward drive position D (or the reverse drive position R), the hydraulic pressure control unit 94 outputs, to the hydraulic control circuit 80, a command to engage the first clutch C1 (or the first brake B1).

In the CVT drive mode, the hydraulic pressure control unit 94 applies the accelerator operation amount θacc and the vehicle speed V to, for example, a predetermined relationship (for example, a CVT shift map, a belt clamping force map). Thus, the hydraulic pressure control unit 94 determines a hydraulic pressure command (hydraulic control command signal Scvt) of each of the primary pressure Pin and the secondary pressure Pout for achieving a target speed ratio γtgt of the continuously variable transmission 24 such that the operating point of the engine 12 is on a predetermined optimal line (for example, an engine optimal fuel consumption line) while a belt slip of the continuously variable transmission 24 does not occur. Then, the hydraulic pressure control unit 94 outputs those hydraulic pressure commands to the hydraulic control circuit 80, and carries out a CVT shift.

The hydraulic pressure control unit 94 controls a change of the driving pattern between the gear drive mode and the CVT drive mode. Specifically, for example, the hydraulic pressure control unit 94 determines whether to change the speed ratio γ by applying the vehicle speed V and the accelerator operation amount θacc, to an upshift line and a downshift line with a predetermined hysteresis for changing the speed ratio between the speed ratio EL in the gear drive mode and the lowest speed ratio γmax in the CVT drive mode. The hydraulic pressure control unit 94 changes the driving pattern on the basis of the determined result.

When the hydraulic pressure control unit 94 determines to upshift in the gear drive mode and changes the driving pattern from the gear drive mode to the CVT drive mode (intermediate vehicle speed), the hydraulic pressure control unit 94 carries out a CtoC shift. Thus, the power transmission path PT in the power transmission system 16 is changed from the first power transmission path PT1 to the second power transmission path PT2. When the hydraulic pressure control unit 94 changes the driving pattern from the CVT drive mode (intermediate vehicle speed) to the CVT drive mode (high vehicle speed), the hydraulic pressure control unit 94 outputs, to the hydraulic control circuit 80, a command to operate the hydraulic actuator 62 to release the dog clutch D1. When the hydraulic pressure control unit 94 changes the driving pattern from the CVT drive mode (high vehicle speed) to the CVT drive mode (intermediate vehicle speed), the hydraulic pressure control unit 94 outputs, to the hydraulic control circuit 80, a command to operate the hydraulic actuator 62 to engage the dog clutch D1. When the hydraulic pressure control unit 94 determines to downshift in the CVT drive mode (intermediate vehicle speed) and changes the driving pattern to the gear drive mode, the hydraulic pressure control unit 94 carries out a CtoC shift. Thus, the power transmission path PT in the power transmission system 16 is changed from the second power transmission path PT2 to the first power transmission path PT1. In change control for changing the driving pattern between the gear drive mode and the CVT drive mode, the change is carried out via the CVT drive mode (intermediate vehicle speed), so the first power transmission path PT1 and the second power transmission path PT2 are changed only by exchanging torque through a CtoC shift. Therefore, change shock is suppressed. In this way, the hydraulic pressure control unit 94 functions as shift control means, that is, a shift control unit, and carries out a CVT shift or a CtoC shift.

The eco-run control unit 96 executes eco-run control. The eco-run control is automatic stop-restart control (idling stop control) over the engine 12. In the eco-run control, other than a start or stop of the engine 12 resulting from user's operation to an ignition key, ignition switch, or the like, for example, when the vehicle 10 has temporarily stopped at an intersection, or the like, or when the vehicle 10 is traveling forward (for example, decelerating) at a low vehicle speed, the engine 12 is automatically temporarily stopped irrespective of user's operation and then the engine 12 is automatically restarted for the purpose of improvement in fuel consumption, reduction in exhaust gas, reduction in noise, and the like.

When a predetermined engine stop condition (idling stop start condition) is satisfied, the eco-run control unit 96 temporarily stops the engine 12 by executing fuel cut control, or the like. At this time, the eco-run control unit 96 drives the electric motor 75 in order to output hydraulic pressure by driving the electric oil pump 74 to rotate, and supplies hydraulic pressure to the hydraulic control circuit 80. On the other hand, when a predetermined engine restart condition is satisfied, the eco-run control unit 96 restarts the engine 12 by driving (cranking) the engine 12 to rotate. After the restart of the engine 12 (for example, after the engine rotation speed Ne has increased to a predetermined rotation speed or higher, by which it is allowed to be determined that the engine 12 has made complete explosion (autonomously rotated)), the eco-run control unit 96 stops driving of the electric oil pump 74. Thus, during a stop of the engine 12, a control pressure of which a source pressure is the line pressure PL based on the electric oil pump 74 is supplied to the first clutch C1, the second clutch C2, or the like.

The predetermined engine stop condition is, for example, a condition in which the shift position is D position, the accelerator is in an off state where the accelerator operation amount θacc is determined as being zero, during a stop of the vehicle during which it is determined that the vehicle speed V is zero (or during traveling that it is determined that the vehicle speed V is lower than or equal to a predetermined eco-run allowable vehicle speed), a wheel brake is in an on state (brake on), and the like. On the other hand, the predetermined engine restart condition is satisfied, for example, when the predetermined engine stop condition is not satisfied after the predetermined engine stop condition is satisfied.

Incidentally, when the eco-run control unit 96 executes eco-run control while the vehicle 10 is traveling, the eco-run control unit 96 releases a lockup clutch of the torque converter 20. Therefore, when eco-run control is being executed, the engine 12 is stopped in rotation (or co-rotated at a low rotation speed) even during traveling. When eco-run control is being executed during traveling, a decrease in the line pressure PL that is entirely secured by the electric oil pump 74 may occur due to a stop of the mechanical pump 42 (or due to an insufficient discharge flow rate of the mechanical pump 42). If a decrease in the line pressure PL occurs during control for engaging the first clutch C1, the C1 pressure Pc1 that is required to control engagement of the first clutch C1 is not secured, and there is a concern that the progress of engaging process stagnates or the engaging process regresses toward the released state and then the first clutch C1 is suddenly engaged at the time when the required C1 pressure Pc1 is secured. Therefore, shock may occur. A decrease in the line pressure PL tends to occur in a range in which the moving speed of the piston PIS1 or piston PIS2 is high in the piston stroke (clutch stroke) of the corresponding clutch C1 or clutch C2. The moving speed of the piston PIS1 tends to increase in a range between a position at which no hydraulic pressure is acting on the piston PIS1 and the piston PIS1 is urged by the return spring SP1 and a position of the piston PIS1 (that is, the position of the piston stroke end) at which the first clutch C1 is able to start transmission of torque when the friction member FP1 is pressed by the piston PIS1. The moving speed of the piston PIS2 tends to increase in a range between a position at which no hydraulic pressure is acting on the piston PIS2 and the piston PIS2 is urged by the return spring SP2 and a position of the piston PIS2 (that is, the position of the piston stroke end) at which the second clutch C2 is able to start transmission of torque when the friction member FP2 is pressed by the piston PIS2. It is presumable that such sudden engagement shock does not occur during a stop of the vehicle.

When the discharge flow rate of the mechanical pump 42 is smaller than a predetermined flow rate and the electric oil pump 74 is being driven while the vehicle is traveling, and when a decrease in the line pressure PL has been detected (or determined) while the first clutch C1 is being controlled from the released state toward the engaged state, the electronic control unit 90 decreases the C1 pressure Pc1 in order to secure the C1 pressure Pc1 that is required in this control as compared to when a decrease in the line pressure PL is not determined.

As a situation that the first clutch C1 is controlled from the released state toward the engaged state while the vehicle is traveling, a CtoC shift for releasing the second clutch C2 and engaging the first clutch C1 in changing the driving pattern from the CVT drive mode (intermediate vehicle speed) to the gear drive mode is conceivable. In this CtoC shift, the hydraulic pressure control unit 94 executes both control for changing the first clutch C1 from the released state toward the engaged state and control for changing the second clutch C2 from the engaged state toward the released state such that a total of transmission torque that is transmitted by the first clutch C1 and transmission torque that is transmitted by the second clutch C2 is constant. When the hydraulic pressure control unit 94 carries out this CtoC shift, the hydraulic pressure control unit 94 controls the first clutch C1 and the second clutch C2 such that the transmission torque to be increased as a result of engaging the first clutch C1 is reduced as a result of releasing the second clutch C2 in order to keep a total of transmission torque that is transmitted by the first clutch C1 and transmission torque that is transmitted by the second clutch C2 constant.

When the torque capacity of the second clutch C2 becomes substantially zero in process of releasing the second clutch C2, the second clutch C2 is substantially released, so the second clutch C2 is not suddenly released even when the C2 pressure Pc2 is rapidly decreased from that state. The C1 pressure Pc1 is secured by the amount of decrease in the C2 pressure Pc2. When a decrease in the line pressure PL is determined and the SL2 pressure Psl2 (C2 pressure Pc2) is lower than or equal to the piston stroke end pressure of the second clutch C2 while the second clutch C2 is being controlled from the engaged state toward the released state, the hydraulic pressure control unit 94 stops supplying the SL2 pressure Psl2 (C2 pressure Pc2) instead of decreasing the C1 pressure Pc1. The piston stroke end pressure is the control pressure Pc1 of the first clutch C1 by which the piston PIS1 can be kept at a position (that is, the position of the piston stroke end) at which the first clutch C1 is able to start transmission of torque in a state just before the torque capacity of the first clutch C1 arises. The piston stroke end pressure is also referred to as an engagement preparation pressure of the first clutch C1. The piston stroke end pressure is the control pressure Pc2 of the second clutch C2 by which the piston PIS2 can be kept at a position (that is, the position of the piston stroke end) at which the second clutch C2 is able to start transmission of torque in a state just before the torque capacity of the second clutch C2 arises. The piston stroke end pressure is also referred to as an engagement preparation pressure of the second clutch C2.

More specifically, the electronic control unit 90 further includes vehicle state determination means, that is, a vehicle state determination unit 98. While the vehicle is traveling, the vehicle state determination unit 98 determines whether the discharge flow rate of the mechanical pump 42 is smaller than the predetermined flow rate and the electric oil pump 74 is being driven. When the vehicle state determination unit 98 determines that the discharge flow rate of the mechanical pump 42 is smaller than the predetermined flow rate and the electric oil pump 74 is being driven, the vehicle state determination unit 98 determines whether a decrease in the line pressure PL has occurred. When the first clutch C1 is being controlled by the hydraulic pressure control unit 94 from the released state toward the engaged state, the vehicle state determination unit 98 determines whether a decrease in the line pressure PL has occurred. For this reason, the vehicle state determination unit 98 determines whether a downshift is being carried out by the hydraulic pressure control unit 94 (that is, whether a CtoC shift for releasing the second clutch C2 and engaging the first clutch C1 is in transition). The CVT drive mode (intermediate vehicle speed) is assumed as the above-described time when the vehicle is traveling. The fact that the discharge flow rate of the mechanical pump 42 is smaller than the predetermined flow rate corresponds to the fact that the rotation speed of the mechanical pump 42 is lower than a predetermined value. The vehicle state determination unit 98 determines whether the discharge flow rate of the mechanical pump 42 is smaller than the predetermined flow rate on the basis of whether the rotation speed of the mechanical pump 42 (that is, the engine rotation speed Ne) is lower than the predetermined value. The predetermined flow rate is, for example, a predetermined upper limit value of the discharge flow rate for determining that the discharge flow rate of the mechanical pump 42 is such a small discharge flow rate that the discharge flow rate cannot be a source of the line pressure PL. The predetermined value is, for example, a predetermined upper limit value of the engine rotation speed Ne for determining that the discharge flow rate of the mechanical pump 42 is smaller than the predetermined flow rate.

The vehicle state determination unit 98 determines whether the vehicle speed V is lower than a predetermined vehicle speed. The predetermined vehicle speed is, for example, a predetermined lower limit value of the rotation speed for maintaining the detection accuracy of the rotation speed sensor 106.

When the vehicle state determination unit 98 determines that the vehicle speed V is higher than or equal to the predetermined vehicle speed, the vehicle state determination unit 98 determines whether a decrease in the line pressure PL has occurred on the basis of a predetermined amount of change in rotation speed. Specifically, when a decrease in the line pressure PL has occurred during a CtoC shift for releasing the second clutch C2 and engaging the first clutch C1, the C2 pressure Pc2 or the C1 pressure Pc1 may decrease as compared to when a decrease in the line pressure PL does not occur. Then, there is a possibility that the input shaft rotation speed Nin drops. The input shaft rotation speed Nin is the predetermined rotation speed, and follows the vehicle speed V during deceleration. For these reasons, the vehicle state determination unit 98 determines whether a decrease in the line pressure PL has occurred on the basis of whether the amount of change (the amount of drop) of an actual input shaft rotation speed Nin to an estimated input shaft rotation speed Nin calculated on the basis of the output shaft rotation speed Nout exceeds a predetermined rotation change amount. The predetermined rotation change amount is a predetermined threshold for determining that a decrease in the line pressure PL has definitely occurred.

When the vehicle state determination unit 98 determines that the vehicle speed V is lower than the predetermined vehicle speed, the vehicle state determination unit 98 determines whether a decrease in the line pressure PL has occurred on the basis of whether the line pressure value VALpl is lower than or equal to a predetermined pressure. The predetermined pressure is a hydraulic pressure lower by a predetermined amount of decrease amount or more in the line pressure PL than the maximum line pressure PL that can be generated by the hydraulic pressure that is dischargeable at the maximum rating of the electric oil pump 74, and is a predetermined threshold for determining that a decrease in the line pressure PL has definitely occurred.

Alternatively, when the vehicle state determination unit 98 determines that the vehicle speed V is lower than the predetermined vehicle speed, the vehicle state determination unit 98 determines whether a decrease in the line pressure PL has occurred on the basis of whether the synchromesh position POSsync has changed by a predetermined movement amount or more. When a decrease in the line pressure PL occurs, the SLG pressure Pslg (synchromesh control pressure Ps1) decreases, so the synchromesh position POSsync may change although the hydraulic control command signal Sswt for the synchromesh electromagnetic valve SLG is not changed. Therefore, a decrease in the line pressure PL is detected on the basis of a change in the synchromesh position POSsync. The predetermined movement amount is a predetermined threshold for determining that a decrease in the line pressure PL has definitely occurred.

Alternatively, when the vehicle state determination unit 98 determines that the vehicle speed V is lower than the predetermined vehicle speed, the vehicle state determination unit 98 determines whether a decrease in the line pressure PL has occurred on the basis of whether the line pressure value VALpl is lower than or equal to the predetermined pressure and the synchromesh position POSsync has changed by the predetermined movement amount or more.

When the vehicle state determination unit 98 determines that a decrease in the line pressure PL has occurred while the first clutch C1 is being controlled from the released state toward the engaged state (that is, during a CtoC shift for releasing the second clutch C2 and engaging the first clutch C1), the hydraulic pressure control unit 94 decreases the C1 pressure Pc1 as compared to when the vehicle state determination unit 98 determines that a decrease in the line pressure PL has not occurred. When the C1 pressure Pc1 during engagement of the first clutch C1 is decreased, the moving speed of the piston PIS1 is decreased, and the engagement speed of the first clutch C1 is decreased. Specifically, the hydraulic pressure control unit 94 decreases the C1 pressure Pc1 in a range from a position at which the piston PIS1 is urged by the return spring SP1 and the moving speed of the piston PIS1 is originally high to the position of the piston stroke end. Therefore, the hydraulic pressure control unit 94 restricts the supply of C1 pressure Pc1 such that the gradient of increase in C1 pressure Pc1 up to the piston stroke end pressure is gentle. For example, the hydraulic pressure control unit 94 restricts the supply of C1 pressure Pc1 by shortening a time of fast fill, decreasing a command hydraulic pressure in fast fill, extending a time of application of a constant standby pressure (corresponding to the piston stroke end pressure) after fast fill, or the like, in the hydraulic control command signal Sswt in process of engaging the first clutch C1.

The hydraulic pressure control unit 94 changes the hydraulic control command signal Sswt in process of releasing the second clutch C2 in CtoC shift such that a total of transmission torque that is transmitted by the first clutch C1 and transmission torque that is transmitted by the second clutch C2 is constant in accordance with the hydraulic control command signal Sswt for decreasing the C1 pressure Pc1 of the first clutch C1 up to the position of the piston stroke end in CtoC shift.

When the C2 pressure Pc2 in process of releasing the second clutch C2 is lower than or equal to the piston stroke end pressure (for example, when the hydraulic control command signal Sswt for the C2 pressure Pc2, by which the C2 pressure Pc2 becomes lower than or equal to the piston stroke end pressure, is issued) in the case where the vehicle state determination unit 98 determines that a decrease in the line pressure PL has occurred, the hydraulic pressure control unit 94 sets the supply of C2 pressure Pc2 to zero by fully closing a supply port Pi of the C2 electromagnetic valve SL2 (that is, fully opening a drain port Po) instead of decreasing the C1 pressure Pc1.

Figure 5:
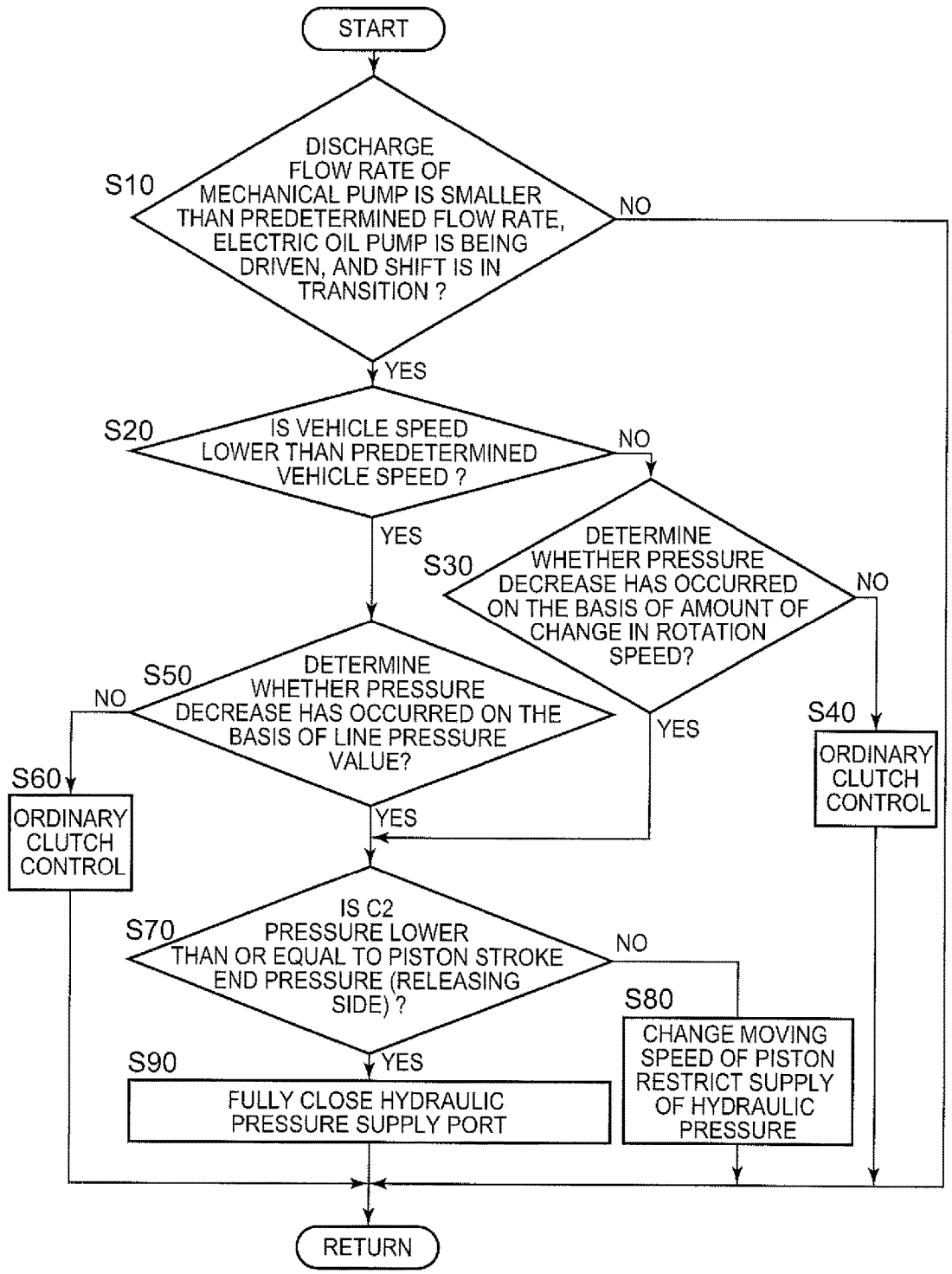
FIG. 5 is a flowchart that illustrates a relevant portion of control operations of an electronic control unit, that is, control operations for preventing or reducing shock at the time when the first clutch is engaged while the entire hydraulic pressure that is the source of C1 pressure is being generated by an electric oil pump during vehicle traveling.
Figure 6:
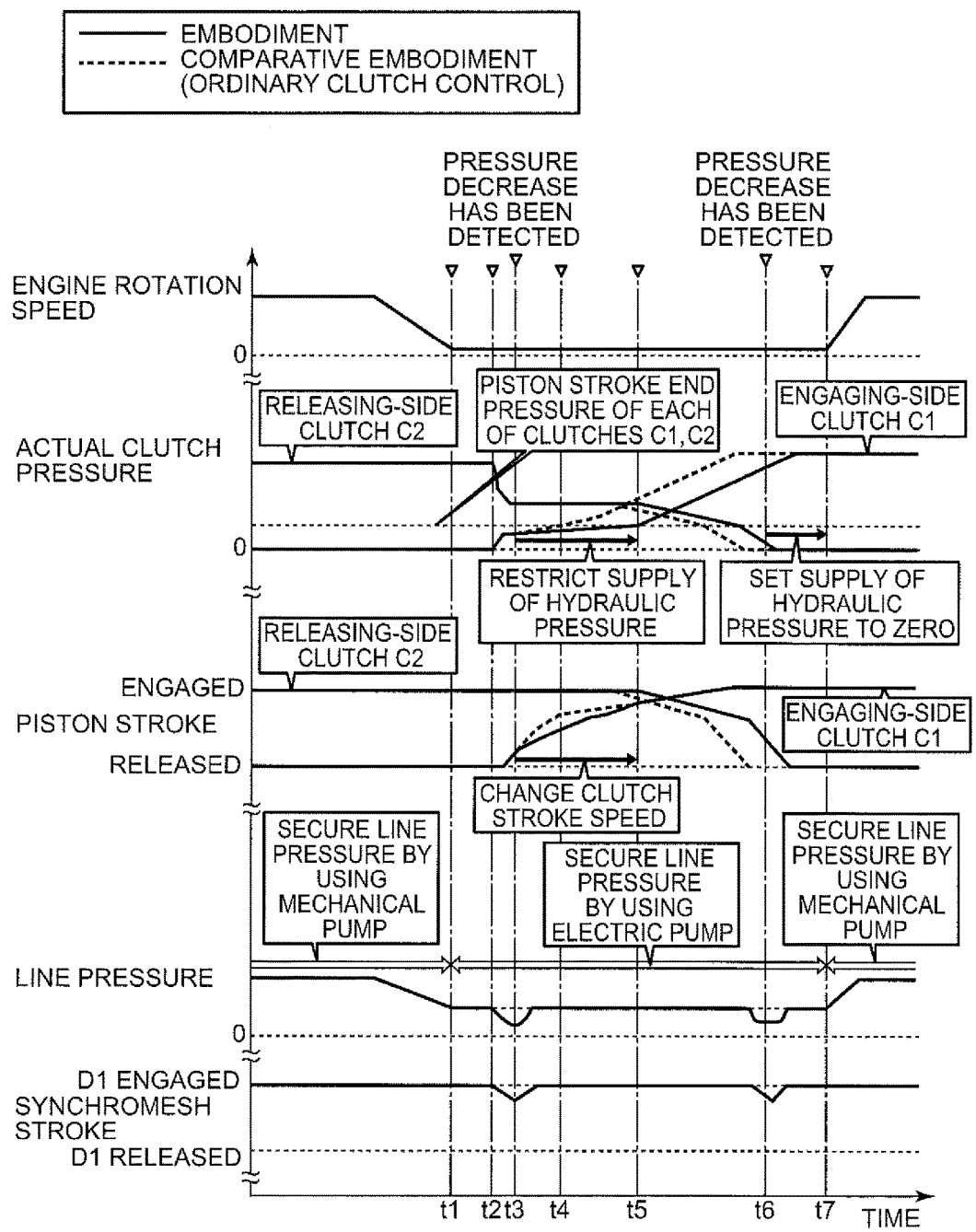
FIG. 6 is an example of a time chart in the case where the control operations shown in the flowchart of FIG. 5 are executed.

FIG. 5 is a flowchart that illustrates a relevant portion of control operations of the electronic control unit 90, that is, control operations for preventing or reducing shock at the time when the first clutch C1 is engaged while the entire hydraulic pressure that is the source of the C1 pressure Pc1 is being generated by the electric oil pump 74 during vehicle traveling. The flowchart is repeatedly executed in the CVT drive mode (intermediate vehicle speed). FIG. 6 is an example of a time chart in the case where the control operations shown in the flowchart of FIG. 5 are executed.

In FIG. 5, initially, in step (hereinafter, step is omitted) S10 corresponding to the function of the vehicle state determination unit 98, it is determined whether the discharge flow rate of the mechanical pump 42 is smaller than the predetermined flow rate, the electric oil pump 74 is being driven and a CtoC shift for releasing the second clutch C2 and engaging the first clutch C1 is in transition. When negative determination is made in S10, the routine is ended. When affirmative determination is made in S10, in S20 corresponding to the function of the vehicle state determination unit 98, it is determined whether the vehicle speed V is lower than the predetermined vehicle speed. When negative determination is made in S20, in S30 corresponding to the function of the vehicle state determination unit 98, it is determined whether a decrease in the line pressure PL has occurred on the basis of the predetermined amount of change in rotation speed. When negative determination is made in S30, in S40 corresponding to the function of the hydraulic pressure control unit 94, the CtoC shift is carried out by using ordinary clutch control (that is, by using the predetermined hydraulic control command signal Sswt). On the other hand, when affirmative determination is made in S20, in S50 corresponding to the function of the vehicle state determination unit 98, it is determined whether a decrease in the line pressure PL has occurred on the basis of whether the line pressure value VALpl is lower than or equal to the predetermined pressure. In S50, as another determination method, it may be determined whether a decrease in the line pressure PL has occurred on the basis of whether the synchromesh position POSsync has changed by the predetermined movement amount or more. Alternatively, it may be determined whether a decrease in the line pressure PL has occurred on the basis of whether the line pressure value VALpl is lower than or equal to the predetermined pressure and the synchromesh position POSsync has changed by the predetermined movement amount or more. When negative determination is made in S50, in S60 corresponding to the function of the hydraulic pressure control unit 94, the CtoC shift is carried out by using ordinary clutch control. When affirmative determination is made in S30 or when affirmative determination is made in S50, in S70 corresponding to the function of the hydraulic pressure control unit 94, it is determined whether the C2 pressure Pc2 in process of releasing the second clutch C2 is lower than or equal to the piston stroke end pressure. When negative determination is made in S70, in S80 corresponding to the function of the hydraulic pressure control unit 94, the moving speed of the piston PIS1 of the first clutch C1 is decreased by restricting the supply of C1 pressure Pc1 such that the gradient of increase in C1 pressure Pc1 up to the piston stroke end pressure is gentle as compared to the case where the CtoC shift is carried out by using ordinary clutch control. When affirmative determination is made in S70, in S90 corresponding to the function of the hydraulic pressure control unit 94, the supply port Pi of the C2 electromagnetic valve SL2 is fully closed.

In FIG. 6, time t1 indicates that the engine 12 is automatically stopped under eco-run control and the engine rotation speed Ne is decreased. Therefore, before time t1, the line pressure PL is secured by the mechanical pump 42; whereas, from time t1 to time t7 at which the engine 12 is automatically started next, the entire line pressure PL is secured by the electric oil pump 74. Time t2 indicates that a CtoC shift for releasing the second clutch C2 and engaging the first clutch C1 is started. When a decrease in the line pressure PL has been detected during the CtoC shift (see time t3), the supply of hydraulic pressure to the first clutch C1 is restricted by reducing the gradient of increase in C1 pressure Pc1 up to the piston stroke end pressure as compared to the case where the CtoC shift is carried out by using ordinary clutch control (see dashed lines). Thus, the supply of C1 pressure Pc1 is easily secured. A point in time at which the C1 pressure Pc1 is increased to the piston stroke end pressure is time t4 in a comparative embodiment indicated by the dashed line; whereas the point in time is time t5 that is later than time t4 in the present embodiment indicated by the continuous line. In this way, in the present embodiment, the moving speed of the piston PIS1 of the first clutch C1 until the C1 pressure Pc1 reaches the piston stroke end pressure is changed so as to be decreased as compared to the comparative embodiment. In accordance with this change, in the present embodiment, releasing the second clutch C2 is delayed. In the present embodiment, in process of releasing the second clutch C2, when the C2 pressure Pc2 is lower than or equal to the piston stroke end pressure at the time when a decrease in the line pressure PL has been detected (see time t6), the supply of C2 pressure Pc2 is set to zero by fully closing the supply port Pi of the C2 electromagnetic valve SL2. Thus, the supply of C1 pressure Pc1 is easily secured.

As described above, according to the present embodiment, when a decrease in the line pressure PL that is the source pressure of the C1 pressure Pc1 that is supplied to the first clutch C1 is determined, the supply of hydraulic pressure to the first clutch C1 is reduced (restricted) by decreasing the C1 pressure Pc1 and the C1 pressure Pc1 that is required at the time of controlling the first clutch C1 from the released state toward the engaged state is decreased. Therefore, it is possible to secure the required C1 pressure Pc1 even when the discharge flow rate of the electric oil pump 74 is not increased. Thus, sudden engagement resulting from the fact that the C1 pressure Pc1 that is required during engagement of the first clutch C1 is secured in a state where the required C1 pressure Pc1 is not secured is avoided or reduced. Therefore, when the entire hydraulic pressure that is the source of the C1 pressure Pc1 of the first clutch C1 is being generated by the electric oil pump 74 during vehicle traveling, it is possible to prevent or reduce shock at the time when the first clutch C1 is engaged. Restriction on the moving speed of the piston PIS1 of the first clutch C1 increases near the piston stroke end before transmission of torque is started, so it is possible to prevent or reduce heat generation, or the like, of the friction member FP1 of the first clutch C1 In addition, the present embodiment is particularly useful in a range in which the vehicle speed V is low and the detection accuracy of the rotation speed sensor 106 is not maintained.

According to the present embodiment, a reduction in transmission torque resulting from releasing the second clutch C2 is controlled in response to an increase in transmission torque resulting from engaging the first clutch C1 in a CtoC shift for releasing the second clutch C2 and engaging the first clutch C1. Therefore, in this CtoC shift, it is possible to keep a total of transmission torque that is transmitted by the first clutch C1 and transmission torque that is transmitted by the second clutch C2 constant.

According to the present embodiment, when a decrease in the line pressure PL has been detected in the CtoC shift, the supply of hydraulic pressure to the second clutch C2 is set to zero in the case where the C2 pressure Pc2 in process of releasing the second clutch C2 is lower than or equal to the piston stroke end pressure. Therefore, it is possible to secure the C1 pressure Pc1 that is required to engage the first clutch C1 while preventing sudden release of the second clutch C2.

The embodiment of the invention is described in detail with reference to the accompanying drawings; however, the invention is also applied to other embodiments.

For example, in the above-described embodiment, the invention is described by way of an example of a CtoC shift for releasing the second clutch C2 and engaging the first clutch C1; however, the invention is not limited to this CtoC shift. For example, the invention is also applicable to engagement of the first clutch C1 or engagement of the dog clutch D1. When the second clutch C2 is not released and only the first clutch C1 is engaged or the dog clutch D1 is engaged, S70 and S90 in the flowchart of FIG. 5 are not provided. In this case, in S10 in the flowchart of FIG. 5, determination as to whether a CtoC shift is in transition is replaced with determination as to whether engagement of a clutch is in transition. In S10 in the flowchart of FIG. 5, it may be determined whether a CtoC shift is in transition during eco-run control while the vehicle is traveling. The invention may be implemented even when S20, S30, S40 are not provided in the flowchart of FIG. 5. In this way, each step in the flowchart of FIG. 5 may be modified as needed without no difficulty. When the invention is also applied to engagement of the dog clutch D1, the dog clutch D1 functions as the first engagement device.

In the above-described embodiment, when a decrease in the line pressure PL is determined during a CtoC shift for releasing the second clutch C2 and engaging the first clutch C1, the C1 pressure Pc1 is decreased, and, when the C2 pressure Pc2 in process of releasing the second clutch C2 is lower than or equal to the piston stroke end pressure at the time when a decrease in the line pressure PL is determined, supply of the C2 pressure Pc2 is stopped instead of decreasing the C1 pressure Pc1. Not limited to such a mode, decreasing the C1 pressure Pc1 and stopping supply of the C2 pressure Pc2 may be carried out at the same time. That is, when the C2 pressure Pc2 in process of releasing the second clutch C2 is lower than or equal to the piston stroke end pressure at the time when a decrease in the line pressure PL is determined, the C1 pressure Pc1 may be decreased and supply of the C2 pressure Pc2 may be stopped. In the case of such an embodiment, S80 in the flowchart of FIG. 5 is executed when affirmative determination is made in S30 or when affirmative determination is made in S50.

In the above-described embodiment, a decrease in the line pressure PL is determined on the basis of the line pressure value VALpl; however, the invention is not limited to this mode. For example, a decrease in the line pressure PL may be determined on the basis of a detected sensor value, such as the primary pressure Pin, the secondary pressure Pout and a forward hydraulic pressure (D range pressure), which is influenced by a decrease in the line pressure PL. As determination as to whether the C2 pressure Pc2 is lower than or equal to the piston stroke end pressure, determination as to whether the hydraulic control command signal Sswt for the C2 pressure Pc2 is lower than or equal to the piston stroke end pressure is illustrated; however, the invention is not limited to this mode. For example, it may be determined whether a detected sensor value of the C2 pressure Pc2 is lower than or equal to the piston stroke end pressure.

In the above-described embodiment, the gear transmission mechanism 28 is the gear transmission mechanism that establishes one speed position having a speed ratio lower than the maximum speed ratio γmax of the continuously variable transmission 24; however, the gear transmission mechanism 28 is not limited to this configuration. For example, the gear transmission mechanism 28 may be a gear transmission mechanism in which a plurality of speed positions having different speed ratios are established. That is, the gear transmission mechanism 28 may be a stepped transmission that is shifted into two or more positions. For example, the gear transmission mechanism 28 may be a gear transmission mechanism that establishes a speed ratio higher than the minimum speed ratio γmin of the continuously variable transmission 24 and a speed ratio lower than the maximum speed ratio γmax.

In the above-described embodiment, the driving pattern of the power transmission system 16 is changed by using the predetermined shift map; however, the invention is not limited to this configuration. For example, the driving pattern of the power transmission system 16 may be changed by calculating a driver's driving request amount (for example, required torque) on the basis of the vehicle speed V and the accelerator operation amount θacc and then setting a speed ratio that satisfies the required torque.

In the above-described embodiment, the engine 12 is illustrated as the driving force source; however, the invention is not limited to this mode. For example, another prime mover, such as an electric motor, may be employed in combination with the engine 12 as the driving force source. The power of the engine 12 is transmitted to the input shaft 22 via the torque converter 20; however, the invention is not limited to this mode. For example, instead of the torque converter 20, another fluid transmission device, such as a fluid coupling having no torque amplification function, may be used. Alternatively, the fluid transmission device is not necessarily provided. The dog clutch D1 includes the synchromesh mechanism S1; however, the synchromesh mechanism S1 does not need to be provided.

In the above-described embodiment, the power transmission system 16 includes the gear transmission mechanism 28 and the continuously variable transmission 24 provided in power transmission paths between the input shaft 22 and the output shaft 30 in parallel with each other; however, the invention is not limited to this mode. In short, as long as a power transmission system including the mechanical pump 42, the electric oil pump 74 and the engagement device that is controlled to be engaged or released by using the control pressure of which a source pressure is the line pressure PL based on the hydraulic pressure that is discharged by the mechanical pump 42 or the electric oil pump 74, the invention is applicable.

What is claimed is:

1. A control apparatus for a power transmission system, the power transmission system being mounted on a vehicle, the power transmission system including a mechanical oil pump, an electric oil pump, and a first engagement device, each of the mechanical oil pump and the electric oil pump being configured to discharge oil such that an operating hydraulic pressure of the power transmission system is generated, the first engagement device being configured to be controlled to be engaged or released by using a first control pressure of which a source pressure is the operating hydraulic pressure, the control apparatus comprising:
   an electronic control unit configured to:
   (i) when a discharge flow rate of the mechanical oil pump is smaller than a predetermined flow rate and the electric oil pump is being driven while the vehicle is traveling, make a determination whether a decrease in the operating hydraulic pressure has occurred; and
   (ii) when the first engagement device is controlled from a released state toward an engaged state while the vehicle is traveling, control the first control pressure, when the determination indicates the decrease in the operating hydraulic pressure has occurred, such that the first control pressure is increased at a lower rate than the first control pressure when the determination indicates the decrease in the operating hydraulic pressure has not occurred, wherein
   the power transmission system includes a second engagement device and a plurality of power transmission paths, the second engagement device is configured to be controlled to be engaged or released by using a second control pressure of which a source pressure is the operating hydraulic pressure, the plurality of power transmission paths are arranged in parallel with each other between an input rotating member and an output rotating member, power of a driving force source of the vehicle is transmitted to the input rotating member, the output rotating member outputs the power to a drive wheel of the vehicle, the plurality of power transmission paths include a first power transmission path and a second power transmission path, the first power transmission path is established when the first engagement device is engaged, the second power transmission path is established when the second engagement device is engaged,
   the electronic control unit is configured to, when controlling the first engagement device from the released state toward the engaged state and controlling the second engagement device from an engaged state toward a released state are executed at the same time, control the first engagement device and the second engagement device such that a total of transmission torque that increases as a result of engaging the first engagement device and transmission torque that reduces as a result of releasing the second engagement device is constant,
   the second engagement device includes a piston and a friction member, the piston moves in a direction to engage the second engagement device or a direction to release the second engagement device by using the second control pressure, the friction member is pressed by the piston, and
   the electronic control unit is configured to, when a decrease in the operating hydraulic pressure has occurred and the second control pressure is lower than or equal to a piston stroke end pressure at the time when the second engagement device is controlled from the engaged state toward the released state, stop supplying the second control pressure instead of decreasing the first control pressure, the piston stroke end pressure is a pressure value of the second control pressure, which is required from the second engagement device to keep the piston at a position at which transmission of torque is started.

* * * * *